United States Patent [19]

Maryschka

[11] 4,345,283
[45] Aug. 17, 1982

[54] RECORDING AND/OR REPRODUCING APPARATUS

[75] Inventor: Gerhard Maryschka, Vienna, Austria

[73] Assignee: U.S. Philips Corporation, New York, N.Y.

[21] Appl. No.: 173,210

[22] Filed: Jul. 23, 1980

[30] Foreign Application Priority Data

Aug. 7, 1979 [AT] Austria .................................. 5399/79

[51] Int. Cl.³ ............................................ G11B 15/66
[52] U.S. Cl. ................................... 360/96.6; 360/137
[58] Field of Search ...................... 360/96.6, 96.5, 137, 360/93, 105; 242/199–200

[56] References Cited

U.S. PATENT DOCUMENTS

| | | | |
|---|---|---|---|
| 3,759,529 | 9/1973 | Yoshii | 360/105 X |
| 3,945,039 | 3/1976 | Yoshii | 360/137 |
| 4,113,262 | 9/1978 | De Stephanis | 360/97 |
| 4,301,484 | 11/1981 | Sawaguchi et al. | 360/96.6 |

*Primary Examiner*—John H. Wolff

*Attorney, Agent, or Firm*—David R. Treacy; Thomas A. Briody

[57] ABSTRACT

Figure 2:
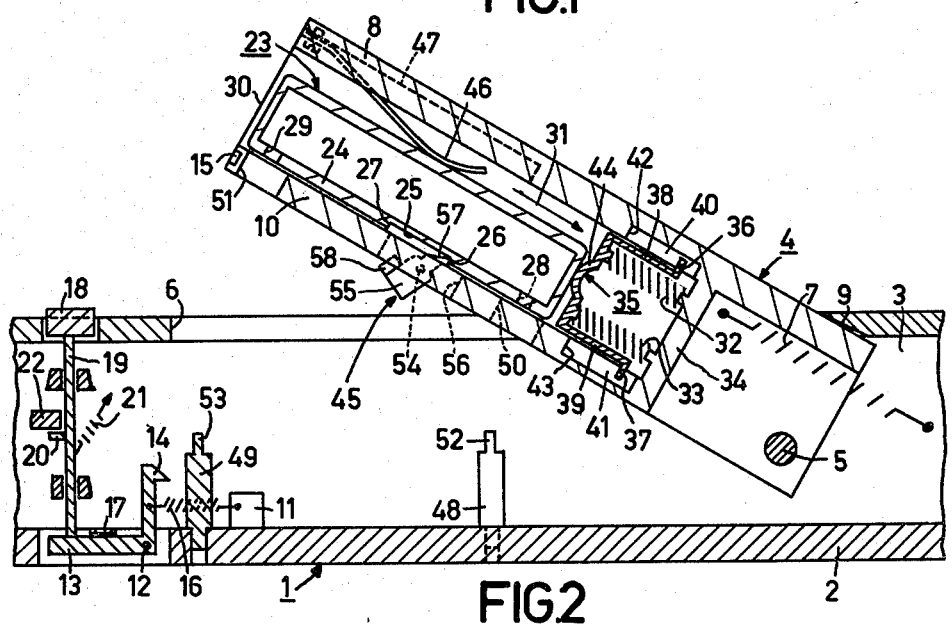

A recording and/or reproducing apparatus (1) for a record carrier in the form of a tape accommodated in a cassette (23) comprises a cassette holder (4), which moves between a loading position and an operating position and is provided with a latching device (45) which latches a cassette which has been inserted into the cassette holder in its loading position. The latching device is constituted by at least one clamping lever (55), which when a cassette is inserted into the cassette holder is pivoted in the direction of insertion (31) of the cassette from a released position into a clamping position, in which the clamping lever constitutes a clamping connection with the inserted cassette, which connection when the cassette holder is moved into its operating position is released by lifting the cassette off the clamping lever, the clamping lever returning to a released position, out of which it can be pivoted by the cassette against the direction of insertion of the cassette when the cassette is removed from the cassette holder (FIG. 2).

4 Claims, 4 Drawing Figures

RECORDING AND/OR REPRODUCING APPARATUS

The invention relates to a recording and/or reproducing apparatus for use with a record carrier in the form of a tape which is accommodated in a cassette, which cassette is adapted to be inserted into a channel-shaped cassette holder on the apparatus, which holder is movable between a loading position and an operating position and comprises a wall which is formed with at least one opening for the passage of members for locating an inserted cassette, which members are arranged on the apparatus, a latching device for the cassette, which cassette is inserted into the cassette holder in the loading position of said holder against the force of at least one spring, and at least one further spring which urges the cassette against said wall of the cassette holder in the loading position of the cassette holder, the inserted cassette being held in an operating position in which it is lifted off the said wall of the cassette holder by the locating members and into which it is released by the latching device against the force of said further spring in the operating position of the cassette receptable.

In such an apparatus known from U.S. Pat. No. 3,759,529 the latching device comprises latching hooks which are stationarily arranged on the cassette holder near an insertion opening of said holder. In the loading position of the cassette holder the latching hooks retain a cassette which has been inserted in the cassette holder against the force of an ejection spring, a further spring urging the inserted cassette against the bottom wall of the cassette holder. When the cassette holder is moved to its operating position the inserted cassette is lifted off the bottom wall, said cassette being disengaged by the latching hooks and being held in its operating position by positioning members on the apparatus. When the cassette holder returns to its loading position, the ejection spring can slide the cassette out of the cassette holder, because it is no longer retained by the latching hooks. It has been found that the user of such an apparatus has to take care that when a cassette is inserted into the cassette holder the cassette is actually positioned behind the stationary latching hooks, because otherwise it is slid out of the cassette holder by the ejection spring. Moreover, such stationary latching hooks could impede a smooth insertion of a cassette into the cassette holder under certain conditions.

It is the object of the invention to provide steps which ensure that a cassette can be inserted to the cassette holder in a simple manner and that an inserted cassette, without special measures having to be taken by the user of the apparatus, is retained in the cassette holder in an absolutely reliable manner, whilst moreover a very simple construction is obtained. According to the invention an apparatus of the type mentioned in the preamble is characterized in that the latching device is constituted by at least one clamping lever which is pivotally connected to said wall of the cassette holder so as to be pivotable about an axis which extends parallel to said wall and at right angles to the direction of insertion of the cassette into the cassette holder, which lever has a free end which projects into the path of insertion of the cassette into the cassette holder and during insertion of the cassette into the cassette holder is pivoted by the cassette from a released position to a clamping position with said free end of the lever moving substantially in the direction of insertion of the cassette, said free end of the clamping lever, when the lever is in the clamping position, forming a clamping connection with the inserted cassette under the influence of the resultant force of the springs which act on the inserted cassette, which connection, when the cassette holder is moved to the operating position thereof is released by lifting the cassette of the clamping lever and returning said lever to its released position, out of which position the clamping lever can be pivoted by the cassette with said free end of the lever moving substantially in the opposite direction to the direction of insertion of the cassette when the cassette is removed from the cassette holder.

This provides a reliable latching device for the cassette in the cassette holder, because in the loading position of the cassette holder the springs which act on the inserted cassette, i.e. on the one hand the springs which urge the cassette against said wall of the cassette holder and on the other hand the springs which tend to eject the cassette from the cassette holder, produce a resultant force which tends to pivot the clamping lever against in a direction such that said free end thereof moves in the opposite direction to the direction of insertion of the cassette into the cassette holder, resulting in the clamping connection between the clamping lever and the inserted cassette. However, when the clamping connection has been released in the operating position of the cassette holder the clamping lever can freely be pivoted out of its released position in the opposite direction to the direction of insertion of the cassette into the cassette holder, which ensures that the latching device is rendered inoperative and thus that ejection of the cassette from the cassette holder, when said holder moves to the loading position is not impeded. It is evident that such a construction is simple and reliable and permits a simple and unimpeded insertion and removal of a cassette.

In respect of a very simple construction it is found to be advantageous if in a cassette holder, which in its loading position has an inclination relative to the horizontal of less than 45°, the clamping lever is pivotally suspended and is held in its released position by the force of gravity to which it is subjected. However, the clamping lever may alternatively be held in its released position by a return spring. In such an apparatus the cassette holder may have substantially any inclination relative to the horizontal in its loading position, which yields greater freedom in respect of the construction.

The free end of the clamping lever may for example be rounded in order to form the clamping connection with the cassette. The surface of the free end of the clamping lever may then also have a higher friction, for example by roughening it or by making the free end of a rubber-like material. It is found to be particularly advantageous if the free end of the clamping lever is wedge-shaped and is engageable behind a projection on said cassette to form the clamping connection with the cassette. This ensures a particularly reliable retention of the cassette in the cassette holder in the loading position thereof.

The invention will be described in more detail hereinafter with reference to the drawings which show two embodiments, given by way of non-limitative examples.

Figure 1:
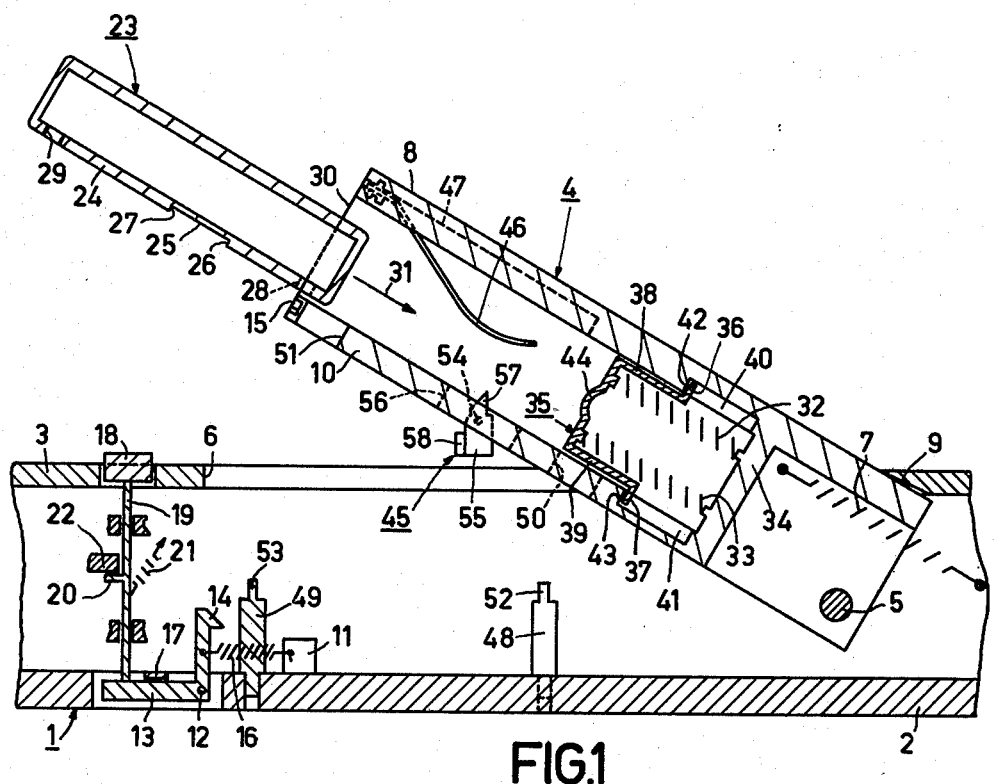
Figure 3:
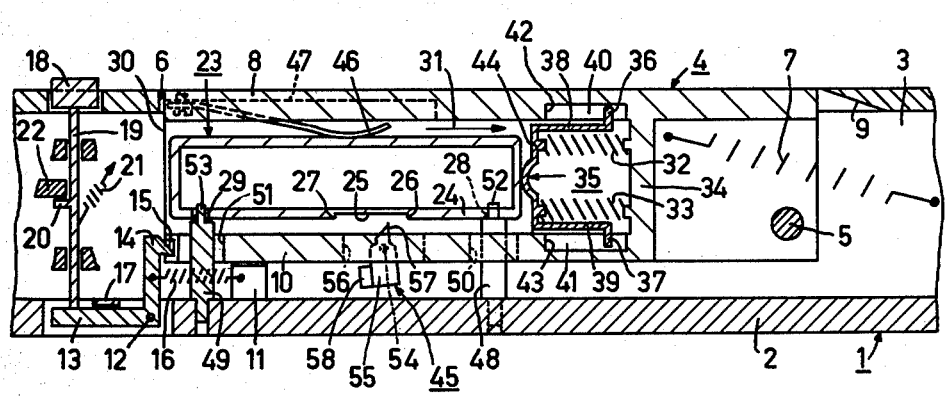
Figure 4:
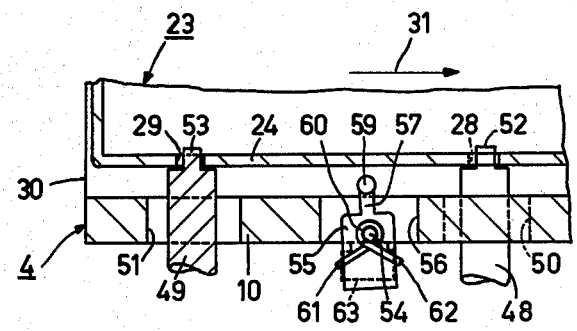

FIG. 1 in a cross-sectional view shows those parts of a recording and/or reproducing apparatus which are relevant to the invention, which apparatus comprises a pivotable cassette holder, which is shown in its loading position and which contains no cassette, and as a latching device for a cassette two pivotally suspended clamping levers, which are shown in their released positions in FIG. 1;

FIG. 2 shows the apparatus of FIG. 1 in a similar cross-sectional view to FIG. 1, the cassette holder, which is shown in its loading position, containing a cassette inserted into said holder and the clamping levers occupying their clamping positions;

FIG. 3 shows the apparatus of FIGS. 1 and 2 in a similar cross-sectional view to these two Figures, the cassette holder, which is shown in its operating position, containing a cassette which is held in its operating position by locating members on the apparatus and the clamping levers occupying their released positions, and FIG. 4 in a cross-sectional view shows a detail of a different recording and/or reproducing apparatus, whose latching device is constituted by a clamping lever which is held in its released position under the influence of a return spring.

The recording and/or reproducing apparatus 1, shown in FIGS. 1 to 3, which is adapted for use in a horizontal operating position, comprises a deck plate 2, which is connected to a housing 3 of the apparatus in a manner not shown. A channel-shaped cassette holder 4 is journalled on the housing 3 so as to be pivotable about a pivot 5. Thus, the cassette holder 4 is movable through an opening 6 in the housing 3 between a loading position, shown in FIGS. 1 and 2, and an operating position, shown in FIG. 3, a tension spring 7, which acts on the housing 3 and on the cassette holder 4, tending to hold the cassette holder 4 in its loading position. As is apparent from FIGS. 1 and 2, the cassette holder has an inclination relative to the horizontal of approximately 30° in its loading position. The loading position is defined by the cassette holder 4 butting with its top wall 8 against a stop 9 on the housing 3 under the influence of the tension spring 7. The operating position of the cassette holder 4 is defined by the bottom wall 10 of the cassette holder 4 butting against the stop 11 provided on the deck plate 2. In order to hold the cassette holder 4 in its operating position against the action of the tension spring 7, there is provided a catch 13 in the form of a bell-crank lever on the deck plate 2, which catch is journalled so as to be pivotable about a pivotal axis 12, the hook-shaped free end 14 of said catch being adapted to engage with a recess 15 in the bottom wall 10 of the cassette holder 4. Under the influence of a spring 16 the catch 13 is then held against an abutment 17 provided on the deck plate 2, in order to obtain a well-defined position for the catch. For releasing the catch 13 there is provided a push-button 18 which is movably guided in the housing 3 and acts on the catch 13 with its actuating rod 19. The actuating rod 19 comprises a projection 20, which under the influence of a spring 21 is held against a stop 22 on the apparatus, in order to define a rest position for the push-button.

In the present case the cassette holder is manually moved from its loading position to its operating position against the action of the tension spring 7, by the user of the apparatus pressing down on the top wall 8 of the cassette holder. Towards the end of the movement of the cassette holder into its operating position the bottom wall 10 presses against the hook-shaped end 14 of the catch 13, so that this catch is slightly pivoted against the action of the spring 16. When the operating position of the cassette holder is reached, the catch 13 pivots back to its initial position under the influence of the spring 16, the hook-shaped end 14 engaging with the recess 15 in the bottom wall 10 of the cassette holder 4. This ensures that the cassette holder 4 is held in its operating position, in which the bottom wall 10 bears on the stop 11. In order to move the cassette holder from its operating position to its loading position, the push-button 18 is actuated, so that the catch 13 is pivoted and releases the cassette holder 4. Subsequently, the cassette holder is moved from its operating position to its loading position by the tension spring 7, in which position it held by the tension spring 7.

The cassette holder 4 serves for receiving a cassette 23, which is schematically shown in FIGS. 1 to 3 and which accommodates a record carrier in the form of a tape, not shown. The record carrier in the form of a tape may for example be carried on two reels, the two reels being arranged adjacent each other in one plane or, alternatively, being arranged coaxially above one another. Alternatively, the cassette may contain only one reel for taking up a record carrier in the form of a tape, but this is irrelevant to the present invention.

The essentially rectangular cassette 23 has a channel-shaped recess 25 in a major wall 24, which recess extends at right angles to the plane of drawing in FIGS. 1 to 3. In this way two projections 26 and 27 are formed by the side wall of the recess 25. Furthermore, the cassette 23 has two locating holes 28 in its major wall 24, which are disposed spaced from each other in a direction parallel to the channel-shaped recess, only one hole being visible in FIGS. 1 to 3, and a further locating hole 29. The locating holes serve for positioning the cassette in its operating position, as will be described in more detail hereinafter with reference to FIG. 3.

Through an opening at the front 30 of the cassette holder 4 the cassette 23 can be inserted into the cassette holder 4, when the latter is in its loading position, in the direction of insertion indicated by an arrow 31, as is shown in FIG. 1. Towards the end of the insertion procedure insertion is effected against the force of two springs 32 and 33, which take the form of compression springs and which each bear with one end against a rear wall 34 of the cassette holder and with the other end against an essentially U-shaped bracket 35, which is movably guided in the direction 31 of insertion of the cassette in the cassette holder 4. The U-shaped bracket 35 comprises two limbs 38 and 39 which are bent outwards at their free ends 36 and 37, which outwardly bend ends 36 and 37 each engage with a recess 40 and 41 respectively formed in the top wall 8 and the bottom wall 10 of the cassette holder. When no cassette has been inserted into the cassette holder, the outwardly bent ends 36 and 37 are held against the ends 42 and 43 respectively of the recesses 40 and 41 under the influence of the springs 32 and 33, so that an end position is defined for the bracket 35, as is shown in FIG. 1. When the cassette is inserted into the cassette holder the cassette butts against the transverse portion 44 of the bracket 35 and moves the bracket against the action of the springs 32 and 33 until the cassette is completely inserted in the cassette holder. As soon as this is the case, the cassette is latched in the cassette holder by a latching device 45, the construction of said device being described in more detail hereinafter. Thus the latching device prevents the cassette which has been inserted into the cassette holder in the loading position thereof from being ejected from the cassette holder under influence of the force exerted by the springs 32 and 33.

In this respect it is to be noted that the springs against whose action the cassette is inserted into the cassette receptacle need not necessarily be arranged in the cassette holder. Such springs may also be provided on the cassette. For example, for this purpose a cassette may be used which is provided with a sleeve which surrounds the cassette or a portion thereof and is movable relative to the cassette and a spring which acts between the sleeve and the cassette, the sleeve being moved relative to the cassette against the force of the spring which acts between the sleeve and the cassette when such a cassette is inserted into the cassette receptacle.

As is furthermore apparent from the Figures, two further springs 46 are provided in the cassette holder 4, which springs are spaced from each other in a direction parallel to the pivot 5 of the cassette holder 4, only one of said springs being visible in FIGS. 1 to 3. The springs 46 take the form of leaf springs and are each disposed in a recess 47 in the top wall 8 of the cassette holder 4. The springs 46 urge a cassette which has been inserted into the cassette holder in the loading position of said holder, against the bottom wall 10 of the cassette holder, as can be seen in FIG. 2.

As already stated, the cassette 23 has locating holes 28 and 39 whereby the cassette which has been inserted into the cassette holder is positioned in its operating position when the cassette holder is in its operating position. For positioning the inserted cassette in its operating position the apparatus 1 comprises three cylindrical locating pins 48 and 49 on the deck plate 2 which pins correspond to the three locating holes 28 and 29 in the major wall 24 of the cassette. When the cassette holder is in its operating position the three locating pins, as is apparent from FIG. 3, extend through three openings 50 and 51 formed in the bottom wall 10 of the cassette holder, in order to cooperate with the cassette inserted into the cassette holder. The cassette then bears against the locating pins 48 and 49 with its major wall 24, cylindrical projections 52 and 53 on the free ends of the locating pins, which projections have a smaller diameter than the locating pins, engaging with the locating holes 28 and 29 of the cassette. In this way the operating position of the cassette is defined, in which position the cassette is lifted off the bottom wall 10 of the cassette holder 4 by the pins 48 and 49 against the force of the leaf springs 46.

In order to hold the cassette in the cassette holder in the loading position of said holder against the force of the two compression springs 32 and 33, there is provided, as stated previously, a latching device 45. In the present case the latching device is constituted by two clamping levers 55 in the bottom wall 10 of the cassette holder, which levers are each pivotable about an axis 54, which extends parallel to said bottom wall and at right angles to the direction 31 of insertion of the cassette 23 in the cassette holder and which are disposed adjacent each other in a direction parallel to the pivot 5 of the cassette holder, only one of said clamping levers being visible in FIGS. 1 to 3. In its bottom wall 10 the cassette holder 4 has two spaced openings 56, in which the clamping levers 55 are accommodated. The free upper ends 57 of the two clamping levers 55 are wedge-shaped and extend into the path of insertion of the cassette into the cassette holder. Thus, when the cassette is inserted into the cassette holder, the two clamping levers 55 can be pivoted in the direction of inserted 31 of the cassette by said cassette from a released position, as is shown in FIG. 1, to a clamping position, which is shown in FIG. 2. In this respect a pivotal movement of the clamping levers 55 in the direction 31 of insertion of the cassette is to be understood to mean a movement of the clamping levers such that the upper ends 57 of the clamping levers are moved in the direction 31 of insertion.

In the present case the two clamping levers 55 are pivotally suspended from the cassette holder and are held in their released positions by the force of gravity which acts on the clamping levers. As is apparent from the figures, the clamping levers 55 are each provided with a projection 58, which faces the front side 30 of the cassette holder, at their ends which are remote from the wedge-shaped ends 57. By providing said projections 58, as is shown in FIGS. 1 and 3, the clamping levers 55 when in their released positions, are held by the force of gravity in a position which is inclined relative to the vertical, the upper ends 57 of the levers being inclined towards the front side 30 of the cassette holder and the lower ends towards the rear side.

As stated previously, when a cassette is inserted into the cassette holder in the loading position of the holder, the clamping levers are pivoted from their released positions to their clamping positions. In the clamping positions of the two clamping levers 55 said levers form at their upper ends 57 a clamping connection with the inserted cassette 23 under the influence of the resultant force exerted by the springs 32 and 33 which act on the inserted cassette in a direction to eject it from the cassette holder and the leaf springs 46 which hold the cassette against the bottom wall 10 of the cassette holder. As is apparent from FIG. 2, when this clamping connection with the cassette is formed the wedge-shaped upper ends 57 of the clamping levers 55 engage behind the projection 26 on the cassette, so that a particularly reliable clamping connection is obtained. The clamping connection between the clamping levers and the cassette, which is formed when the cassette is inserted into the cassette holder in the loading position thereof, is released when the cassette holder is moved into its operating position. The release is effected by the inserted cassette being lifted off the bottom wall of the cassette holder by the locating pins 48 and 49, since this also lifts the cassette off the clamping levers which are thereby faced to their released positions, so that the cassette is no longer retained by the clamping levers. This situation is shown in FIG. 3. When the cassette is removed from the cassette holder the clamping levers 55 can be moved out of the released position shown in FIG. 3 by the cassette only in the direction opposite to the direction 31 of insertion of the cassette, as will be described hereinafter. As can be seen in FIG. 3, in relation to the cassette holder the released position of the clamping levers which is represented in FIG. 3 does not correspond to the released position represented in FIG. 1, which is determined by the force of gravity acting on the pivotally suspended clamping levers, because in the two situations represented in FIGS. 1 and 3 the cassette holder occupies different positions. However in both cases the clamping levers are in a released position, because a released position of the clamping levers relative to the cassette is to be understood to mean all positions of the clamping levers in which the clamping levers do not form a clamping connection with the cassette.

When the cassette 23 is inserted into the cassette holder in the loading position thereof by a simple retilinear movement in the direction 31 of insertion as is shown in FIG. 1, the cassette will engage the wedge-shaped upper ends 57 of the clamping levers 55, which are in the released positions and the upper end of which project into the cassette holder, and will pivot said levers so far in the direction 31 of insertion of the cassette that the upper ends 57 slide over the major wall 24 of the cassette. Subsequently, the cassette butts against the bracket 35 and moves said bracket against the force of the compression springs 32 and 33, said springs thereby being compressed. During insertion the leaf springs 46, which are arranged on the top wall 8 of the cassette holder, also cooperate with the cassette and urge the cassette against the bottom wall 10 of the cassette holder. As soon as the cassette has been inserted completely into the cassette holder, the clamping levers 55 engage behind the projection 26 on the major wall 24 of the cassette with their wedge-shaped upper ends 57 under the influence of the force of gravity which acts on said levers. Under the influence of the resulting force of the springs 32 and 33 which act on the cassette, the inserted cassette tends to move the upper ends of the clamping levers 55 in the opposite direction to the direction 31 of insertion of the cassette 23 in the cassette holder, but the clamping levers cannot perform this movement with the result that a clamping connection is formed between the clamping levers and the cassette, thus ensuring that the cassette is firmly retained in the cassette holder by the clamping levers when the holder is in its loading position.

As already stated in the foregoing, the cassette holder can be pivoted manually to its operating position, the cassette holder being moved into the apparatus during this pivoted movement through the opening 6 in the housing 3. Just before the cassette holder reaches its operating position, the projections 52 and 53 on the locating pins 48 and 49 engage with the locating holes 28 and 29 of the cassette and the cassette butts with its major wall 24 against the locating pins under the influence of the leaf springs 46, as is shown in FIG. 3. As the cassette holder is pivoted further towards its operating position the bottom wall 10 of the cassette holder is consequently moved away from the major wall 24 of the cassette, the pivotally suspended clamping levers 55 also being moved away from the cassette and pivoting to their released positions, shown in FIG. 3, under the influence of the force of gravity, in which positions the clamping levers are inclined relative to the vertical, the upper ends 57 of the clamping levers being inclined towards the front 30 of the cassette holder relative to the vertical. In this way the clamping connection formed when the cassette is inserted into the cassette holder is automatically released when the cassette holder is moved to its operating position, the cassette, when the cassette-holder is in its operating position, being held in an operating position in which it is lifted off the bottom wall of the cassette holder by the locating pins on the apparatus and into which it is released by the latching device constituted by the clamping levers. Thus, in the operating position of the cassette the compression springs 32 and 33 which act on the cassette via the bracket 35 cannot cause a movement of the cassette in the direction opposite to the direction of insertion thereof, because this is prevented by the projections 52 and 53 on the locating pins 48 and 49 which engage with the locating holes. As already stated, the cassette holder is thus firmly held in its operating position by means of the catch 13.

When the cassette holder is to be returned from its operating position into its loading position, the push-button 18 is actuated. As a result of this the catch 13 is pivoted and releases the cassette holder, so that under the influence of the tension spring 7 said holder is pivoted into its loading position. When the cassette holder leaves its operating position, the bottom wall 10 of the cassette holder is lifted against the cassette which is initially retained by the locating pins 48 and 49. The upper ends 57 of the clamping levers 55 which are secured to the bottom wall of the cassette holder, then butt against the major wall 24 of the cassette and owing to the fact that in the previously occupied released positions of the clamping levers the upper ends thereof occupied a position which is inclined relative to the vertical in the opposite direction to the direction of insertion of the cassette due to the presence of the projections 58 on the clamping levers 55, the upper ends of said levers are pivoted further in said opposite direction. Thus, the clamping levers can no longer form a clamping connection with the cassette when the cassette holder is moved further out of its operating position to its loading position. During the further movement of the cassette holder the bottom wall 10 thereof butts against the major wall 24 of the cassette, after which the cassette is lifted off the locating pins 48 and 49 and the projections 52 and 53 are withdrawn from the locating holes 28 and 29. As soon as this has happened the cassette, which has been released by the locating pins and the clamping levers, is slightly slid out of the cassette holder in the opposite direction to the direction 31 of insertion under the influence of the compression springs 32 and 33, the cassette keeping the upper ends of the clamping levers pivoted in the opposite direction to the direction of insertion of the cassette into the cassette holder. As soon as the cassette holder occupies its loading position the cassette, which has been moved by the compression springs 32 and 33, already projects partly from the cassette holder, the bracket 35 engaging with the outwardly bent ends of its limbs 38 and 39 the ends 42 and 43 respectively of the recesses 40 and 41. Now the cassette can easily be gripped and pulled out of the cassette holder. After the cassette has been taken out of the cassette receptacle the clamping levers return to their released positions, shown in FIG. 1, under the influence of the force of gravity, out of which positions they can again be pivoted into the clamping position shown in FIG. 2 when subsequently a cassette is inserted. Thus, immediately after a cassette has been removed from the cassette holder, the clamping levers are ready for again retaining a cassette which is subsequently inserted into the cassette holder.

In the apparatus of FIGS. 1 to 3, as is apparent from the foregoing, a cassette which has been inserted into the cassette holder in the loading position thereof is simply retained in said holder by the clamping levers, the retention being effected by a releasable clamping connection between the clamping levers and the cassette. Suitably, the clamping connection is automatically released when the cassette holder is moved into its operation position. When the clamping connection is released the clamping levers are pivoted into a released position, in which position the clamping levers, when the cassette is being removed from the cassette holder, can no longer form a clamping connection with the cassette.

FIG. 4 shows a detail of another recording and/or reproducing apparatus, whose cassette holder 4 is shown in its operating position. For a latching device 45 for a cassette 23 which has been inserted into the cassette holder 4 the apparatus comprises only one clamping lever 55 which is pivotable about an axis 54. On its free upper end 57 the clamping lever 55 is provided with a cylindrical clamping member 59 the axis of which extends in a direction parallel to the axis 54, and which member consists of rubber in order to obtain a high friction during cooperation with the cassette. As is shown in FIG. 4, the clamping lever 55 is held in its released position by a return spring 60. The return spring 60 takes the form of a wire torsion spring which is arranged on the spindle 54 and whose ends 61 and 62 are bent round to extend at right angles to the plane of drawing. Between the bent ends 61 and 62 the clamping lever 55 is disposed, said bent ends bearing under stress against a lug 63 which projects from the bottom wall 10 of the cassette holder 4. This lug 63 is so shaped and occupies such a position relative to the clamping lever that in its released position the clamping lever 55, in a similar way to that already described for the apparatus in accordance with FIGS. 1 to 3, occupies an inclined position relative to the major wall 24 of the cassette 13, so that the upper end 57 of the clamping lever is inclined in the opposite direction to the direction 31 of insertion of the cassette and it is again ensured that when the cassette is removed from the cassette holder, after the cassette holder has been moved from its operating position into its loading position, the clamping lever cannot form a clamping connection with the cassette under the influence of the resulting force of the springs which act on the cassette. The operation of the latching device 45 of the apparatus of FIG. 4 is similar to that of the apparatus in accordance with FIGS. 1 to 3. In the apparatus of FIG. 4 a cassette is also firmly retained in the cassette holder by the clamping lever. By using a spring to return the clamping lever to its released position it is ensured that the clamping lever can form a clamping connection with an inserted cassette in any position of the recording and/or reproducing apparatus.

What is claimed is:

1. A recording and/or reproducing apparatus for use with a record carrier in the form of a tape which is accommodated in a cassette, which cassette is adapted to be inserted into a channel-shaped cassette holder on the apparatus, which holder is movable between a loading position and an operating position and comprises a wall formed with at least one opening for the passage of members provided for locating an inserted cassette which members are arranged on the apparatus, a latching device for the cassette, which cassette is inserted into the cassette holder in the loading position of said holder against the force of at least one spring, and at least one further spring which urges the cassette against said wall of the cassette holder in the loading position of the cassette holder, the inserted cassette being held in an operating position in which it is lifted off said wall of the cassette holder by the locating members and into which it is released by the latching device against the force of said further spring in the operating position of the cassette holder, characterized in that the latching device is constituted by at least one clamping lever which is pivotally connected to said wall of the cassette holder so as to be pivotable about an axis which extends parallel to said wall and at right angles to the direction of insertion of the cassette into the cassette holder, whch lever has a free end which projects into the path of insertion of the cassette into the cassette holder and during insertion of the cassette into the cassette holder is pivoted by the cassette from a released position to a clamping position with said free end of the lever moving substantially in the direction of insertion of said cassette, said free end of the clamping lever, when the lever is in the clamping position, forming a clamping connection with the inserted cassette under the influence of the resultant force of the said at least one spring and said at least one further spring which act on the inserted cassette, which connection when the cassette receptacle is moved to the operating position thereof, is released by lifting the cassette off the clamping lever and returning said lever to its released position, out of which position the clamping lever can be pivoted by the cassette with said free end of the lever moving substantially in the oppoite direction to the direction of insertion of the cassette when the cassette is removed from the cassette holder.

2. An apparatus as claimed in claim 1, characterized in that in a cassette holder, which in its loading position has an inclination relative to the horizontal of less than 45°, the clamping lever is pivotally suspended and is held in its released position by the force of gravity to which it is subjected.

3. An apparatus as claimed in claim 1, characterized in that the clampin lever is held in its released position by a return spring.

4. An apparatus as claimed in any of the preceding claims, characterized in that the free end of the clamping lever is wedge-shaped and is engageable with a projection on said cassette to form the clamping connection with the cassette.

* * * * *